United States Patent
Hochwarth et al.

(10) Patent No.: US 11,698,794 B2
(45) Date of Patent: Jul. 11, 2023

(54) SYSTEMS AND METHOD FOR FLEXIBLE ACCESS OF A REGULATED SYSTEM

(71) Applicant: GE AVIATION SYSTEMS LLC, Grand Rapids, MI (US)

(72) Inventors: Joachim Karl Ulf Hochwarth, Caledonia, MI (US); Victor Mario Leal Herrera, Queretaro (MX); Antonio Lugo Trejo, Queretaro (MX); Joshua Michael Krbez, Kentwood, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 289 days.

(21) Appl. No.: 17/010,167

(22) Filed: Sep. 2, 2020

(65) Prior Publication Data

US 2022/0066789 A1    Mar. 3, 2022

(51) Int. Cl.
  $G06F\ 9/44$    (2018.01)
  $G06F\ 9/445$   (2018.01)
  $G06F\ 9/448$   (2018.01)

(52) U.S. Cl.
  CPC .......... $G06F\ 9/44505$ (2013.01); $G06F\ 9/448$ (2018.02)

(58) Field of Classification Search
  CPC ................. G06F 1/32; G06F 9/44; G06F 1/12
  See application file for complete search history.

(56) References Cited

U.S. PATENT DOCUMENTS

| | | | |
|---|---|---|---|
| 7,043,416 B1 * | 5/2006 | Lin | G06F 11/3664 712/E9.05 |
| 10,054,957 B2 | 8/2018 | Cherepinsky et al. | |
| 10,068,488 B2 | 9/2018 | Ramaker et al. | |
| 10,417,261 B2 | 9/2019 | Hochwarth et al. | |
| 2005/0080606 A1 | 4/2005 | Ampunan et al. | |
| 2012/0320075 A1 * | 12/2012 | Silk | G06F 3/14 345/581 |
| 2014/0244893 A1 * | 8/2014 | Dickey | G06F 11/30 711/102 |
| 2017/0168810 A1 | 6/2017 | Knijnenburg et al. | |
| 2017/0289309 A1 | 10/2017 | Judd et al. | |
| 2017/0344843 A1 * | 11/2017 | Wang | H04N 21/2353 |
| 2019/0114926 A1 | 4/2019 | Kumari et al. | |
| 2019/0152619 A1 | 5/2019 | Mohan et al. | |
| 2019/0311632 A1 | 10/2019 | Hochwarth et al. | |
| 2020/0097196 A1 | 3/2020 | Hochwarth et al. | |
| 2020/0128373 A1 | 4/2020 | Stevens et al. | |

* cited by examiner

*Primary Examiner* — Keshab R Pandey
(74) *Attorney, Agent, or Firm* — McGarry Bair PC

(57) ABSTRACT

A method to provide flexible access to an internal data of an regulated system, the method comprising receiving, by a data access component of the regulated system, a loadable configuration file defining a set of triggering events and a set of memory, determining the occurrence of a single triggering event, accessing at least a subset of memory that contain the internal data of the avionics system to retrieve data associated with the one or more memory of the set of memory, and outputting the retrieved data to a receiving component.

20 Claims, 6 Drawing Sheets

SYSTEMS AND METHOD FOR FLEXIBLE ACCESS OF A REGULATED SYSTEM

The disclosure relates to a method and apparatus for flexible access to at least a portion of a regulated system.

BACKGROUND OF THE DISCLOSURE

Modern aircraft employ complex Flight Management Systems (FMSs) that handle and control large amounts of important data for the aircraft, along with operating at least a portion of the aircraft. Presently, in order to access (e.g. read or write) internal data of the FMS, an access interface that is defined at compile time in the software is required. Due to certification requirements and safety concerns, changing or altering this access interface necessitates additional testing and recertification. As a result of the additional testing and recertification requirements, the access interface can be difficult and costly to change. Often these access interfaces will have undergone many changes throughout the course of a development program, but are too costly to change once the system is in service.

BRIEF DESCRIPTION

In one aspect, the present disclosure relates to a method to provide flexible access to internal data of a regulated system, the method comprising receiving, by a data access component of the regulated system, a loadable configuration file that defines a set of triggering events and a set of memory, wherein each triggering event of the set of triggering events is associated with a respective subset of memory, in response to determining the occurrence of a triggering event of the set of the triggering events, accessing, by the data access component, the subset of memory that contain the internal data of the regulated system to retrieve data associated with the set of memory associated with the triggering event defined by the loadable configuration file, and outputting, by the data access component, the retrieved data to a receiving component.

In another aspect, the present disclosure relates to a method to provide flexible access to internal data of a regulated system, the method comprising generating, by a configuration tool, a loadable configuration file defining a set of triggering events and a set of memory, wherein each triggering events of the set of triggering events is associated with a respective subset of memory, loading the loadable configuration file at the regulated system, monitoring the regulated system for at least a subset of the triggering events during runtime, and in response to determining at least one triggering event is met during runtime, outputting, by a data access component, the subset of memory associated with the at least one triggering event.

In yet another aspect, the present disclosure relates to a system, comprising a set of memory, a data access component having a loadable configuration file defining a set of triggering events and the set of memory, wherein each triggering event of the set of triggering event is associated with a respective subset of the memory, wherein the data access component subscribes to data in the respective subset of memory based on the loadable configuration file and configured to, in response to the occurrence of at least one triggering event of the set of triggering events, outputs the data based on the subset of memory associated with the respective triggering event, and a receiving component communicatively coupled with the data access component and configured to receive the out of data by the data access component and decode the output of data from the data access component based at least in part on the configuration file.

BRIEF DESCRIPTION OF THE DRAWINGS

A full and enabling disclosure of the present description, including the best mode thereof, directed to one of ordinary skill in the art, is set forth in the specification, which makes reference to the appended FIGS., in which.

DETAILED DESCRIPTION

Figure 1:
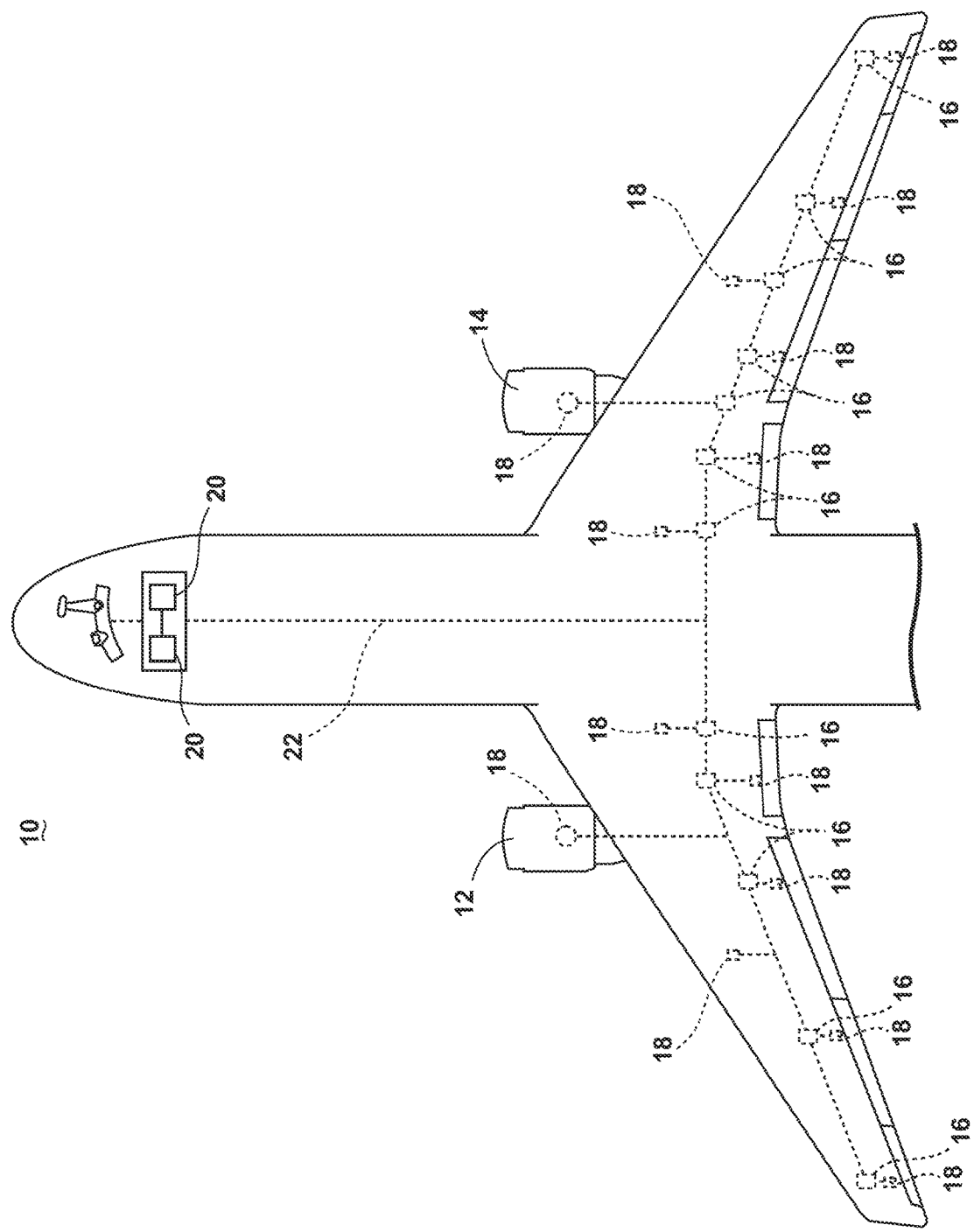
FIG. 1 illustrates a top-down schematic view of an aircraft, in accordance with various aspects described herein.

Aspects of the disclosure can be implemented in any operation of a regulated system. Specifically, the apparatus or system described herein can allow for flexible access of the regulated system to define a set of triggering events. A loadable configuration file can include, at least, a set of triggering events and defining at least one memory or a set of memory within the regulated system, which can be received by at least a portion of the regulated system. Specifically, a data access component can receive the loadable configuration files. As used herein, the term "memory" can refer to at least one data element either within or accessible through the regulated system and configured to store at least one set of data or a subset of data either temporarily or permanently. It will be appreciated that there can be any number of memory within the regulated system and that a collective set of memory can referred to as "memory" or "memories". A condition monitor can be included within the regulated system to monitor for the occurrence of at least one triggering event of the set of triggering events. The set of triggering events can each be associated with a respective subset of memory of the set of memory such that if one or more triggering events occurs within the regulated system and is detected via the condition monitor, then at least a portion of the regulated system can retrieve data associated with the triggering events that occur from one or more corresponding memory of the set of memory of the regulated system. The data that is retrieved can be subsequently sent to a receiving component of the system. Although described in terms of the regulated system, it will be appreciated that the method and system to allow for flexible access to one or more regulated system such as, for example, an avionics system.

To ensure dynamic or continuous operation of the regulated system, the set of triggering events or the set of memory can be continuously updated and input into the regulated system. The system and method described herein does not require for the avionics system to recertify or recompile the updated sets of triggering events or the set of memory in order for them to be input into the regulated system through one or more loadable configuration files.

Thus, aspects of the present disclosure provide a technique to customize or otherwise define data, values, parameters, or the like, related to the set of triggering events of the regulated system during runtime. As used herein, the term "triggering events" can refer to one or more events which can occur within the regulated system that can result or otherwise generate an output retrieval of data. For example, in terms of an avionic system, the triggering event can be a threshold altitude such that when a portion of the avionic system determines the threshold altitude has been reached, the one or more sets of data related to the operation of the aircraft at the threshold altitude can be generated, received, or otherwise output via at least a portion of the regulated system. Furthermore, aspects of the present disclosure enable enhanced, flexible, and robust editing, modification, or updating of flight test data, testing, debugging, and analyzing of in-service problems. In yet another instance, aspects of the disclosure can provide for or enable an open or accessible interface to third-party applications running on either the embedded system or outside of it to interact with the system (e.g. an embedded Advanced Interval Management (A-IM) application or an application running on an Electronic Flight Bag (EFB)).

Further aspects of the disclosure can be implemented in any environment, apparatus, system, or method having a regulated, restricted, authorized, or otherwise limited write-access privileges to a memory or data store component. As used herein, "write-access" means availability or authorization to commit a change to a memory location, the change being storing or overwriting data, values, commands, instructions, or any other data, element, or identifier to a memory location, regardless of the function performed by the data, element, or identifier, or regardless of the function or implementation of the environment, apparatus, system, or method. Collectively, "access" to data or "accessing" data can refer to either reading, viewing, or otherwise receiving data from a data store, "writing" data, as referenced above, or a combination thereof. As used herein, the term "regulated system" can refer to a system having restrictions on access, such as write-access to data or values of the system, whereby only approved or authorized entities, parties, functions, or the like, are enabled or otherwise allowed to access the regulated or restricted elements. In one non-limiting example, only a single authorized function can have write-access to a specific data element. Non-limiting examples of the regulated system can include, but is not limited to, a regulated ARINC system, a regulated avionics system, a regulated Flight Management System (FMS), or systems that interact therewith. As used herein, a regulated system can further include a system designed for regulated access controls regardless of installation or certification status. For example, the regulated system can refer to a non-certified FMS used in a testing scenario. Although example aspects of the present disclosure are discussed with reference to regulated system being the avionics systems such as an FMS, the subject matter described herein can be used with or applied to provide flexible access to internal data of other systems, vehicles, machines, industrial or mechanical assets, or components without deviating from the scope of the present disclosure.

While "a set of" various elements will be described, it will be understood that "a set" can include any number of the respective elements. It will be yet further understood that the "a set" can include only one element. Also as used herein, while elements or components can be described as "sensing" or "measuring" a respective value, data, function, or the like, sensing or measuring can include determining a value indicative of or related to the respective value, data, function, or the like, rather than directly sensing or measuring the value, data, function, or the like, itself. The sensed or measured value, data, function, or the like, can further be provided to additional components. For instance, the value can be provided to a controller module or processor, and the controller module or processor can perform processing on the value to determine a representative value or an electrical characteristic representative of said value, data, function, or the like.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching logic, or any other connectors configured to enable or disable the connection between respective elements or component.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, Digital Versatile Discs (DVDs), Compact Disc—Read Only Memory (CD-ROMs), etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

As used herein, a "data store" can include a set of data values stored in a memory, wherein the data value is only write-accessible by a single function, program, entity, or the like (a "writer"). The write-accessibility of the data store can be policed or otherwise regulated by digital security mechanisms understood by those skilled in the art. While only a single writer has write-access to the data store, a data store can have or include multiple functions, programs, or entities having read-access to read, view, or otherwise receive the data in a unidirectional relationship. In contrast with the data store, a data store queue can include a data value or set of data values stored in a memory, wherein the data value is write-accessible by a set of one or more functions, programs, entities, or the like. The write-accessibility of the data store queue can be policed or otherwise regulated by digital security mechanisms understood by those skilled in the art.

Additionally, a data store queue can include only a single function, program, or entity having read-access to read, view, or otherwise receive the data in a unidirectional relationship. In non-limiting examples, this read operation can be one-time or destructive (e.g. removing the data after the access operation). It will be further appreciated that while only a single writer is shown to have write-access to a corresponding memory that there can be any number of one or more writers configured to have write-access to any one or more suitable memory of the set of memory of the regulated system. It will be yet further appreciated that there can be any number of one or more readers within or otherwise accessible through the regulated system having read-access to any one or more suitable memory of the regulated system.

Reference will now be made in detail to aspects of the disclosure, one or more non-limiting examples of which are illustrated in the FIGS. Each example is provided by way of explanation of the disclosure, not limitation of the disclosure. In fact, it will be apparent to those skilled in the art that various modifications and variations can be made in the present disclosure without departing from the scope or spirit of the disclosure. Thus, it is intended that the present disclosure covers such modifications and variations as come within the scope of the appended claims and their equivalents.

Example aspects of the present disclosure are directed to systems and methods that enable flexible access to internal data of a regulated system. Non-limiting examples of the regulated system can include, but are not limited to, an avionics system, or other embedded devices suitable to enable flexible access to internal data of the regulated system. Further non-limiting examples of the regulated systems can include, but are not limited to, an FMS, an Airport Surface Map System (ASMS), or the like. In particular, an access interface that is defined at compile time in the software is typically required to access internal data from the FMS. However, changing or altering the access interface necessitates source code modification, re-compilation, which requires re-certification, which ultimately requires re-verification. As such, changing or alternating the access interface ultimately results in an increase in cost, and an increase in testing burden, which yet further increases the cost. Creating multiple versions of a compiled program can be very expensive and difficult to maintain. As a result of such additional testing and recertification requirements, the access interface can be difficult and costly to change.

Aspects of the present disclosure provide a technique to select, customize, or otherwise flexibly define data, specifically a set of triggering events, that is input or received by the regulated system during runtime. In particular, in some implementations, systems of the present disclosure can include a configuration tool that enables a system operator to make selections (e.g., via a user interface) of which data is thereafter input or received by or otherwise provided from the regulated system during runtime, for storing in, or writing to, memory.

The exemplary drawings are for purposes of illustration only and the dimensions, positions, order and relative sizes reflected in the drawings attached hereto can vary.

Referring now to FIG. 1, an example aircraft 10 is shown having a fuselage and at least one turbine engine, shown as a left engine system 12 and a right engine system 14. The left and right engine systems 12, 14 may be substantially identical. While the left and right engine systems 12, 14, specifically turbine engines, are illustrated, the aircraft 10 may include fewer or additional engine systems, or alternative propulsion engine systems, such as propeller-based engines.

The aircraft 10 is shown as further comprising a plurality of sensors, systems, and components, collectively referred to as Line-Replaceable Units (LRUs) 16, 18, and at least one server 20 or computing unit, shown as two FMSs, or flight control computers, located proximate to each other, near the nose of the aircraft 10. At least one of the servers 20 may further include memory.

The LRUs 16, 18 and servers 20 may be communicatively interconnected by transmission or communication lines defining a data communications network 22, traversing at least a portion of the aircraft 10. Additional LRUs 16, 18 can be included. While a server 20 is described, aspects of the disclosure can include any computing system, flight computer, or display system displaying data from multiple systems.

The memory of the servers 20 can include RAM, flash memory, or one or more different types of portable electronic memory, etc., or any suitable combination of these types of memory. The LRUs 16, 18 or servers 20 may be operably coupled with the memory such that the LRUs 16, 18 or servers 20, or any computer programs or processes thereon, may access at least a portion of the memory (e.g. "shared memory").

The aircraft 10 shown in FIG. 1 is merely a schematic representation of one non-limiting example environment of the disclosure and used to illustrate that a plurality of LRUs 16, 18 and servers 20 may be located throughout the aircraft 10. The exact location of the LRUs 16, 18 and servers 20 are not germane to the aspects of the disclosure. Additionally, more or fewer LRUs 16, 18 or servers 20 may be included in aspects of the disclosure.

The communications network 22 is illustrated schematically as a bus but may include a number of data communication connectors and interfaces, for example, Ethernet or fiber optic cables, and routing or switching components, to facilitate the communicative interconnection between the LRUs 16, 18 and servers 20. Furthermore, the configuration and operation of the communications network 22 may be defined by a common set of standards or regulations applicable to particular aircraft environments. For example, the communications network 22 on an aircraft 10 may be defined by, or configured according to, the ARINC 664 (A664) standard, ARINC 429 (A429) standard, ARINC 825 (A825) standard, or the RS-422 standard.

Figure 2:
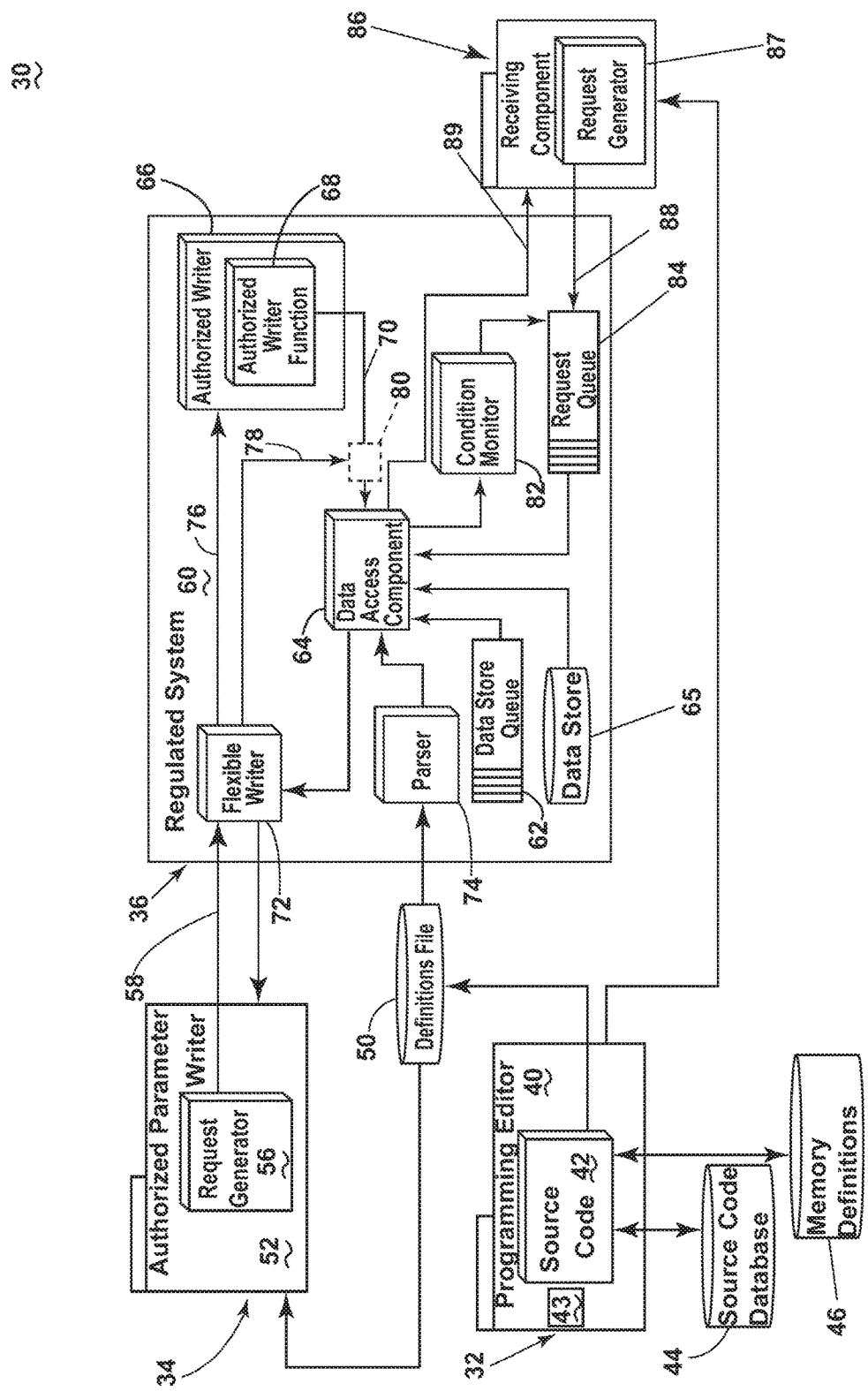
FIG. 2 illustrates an example schematic view of a system to provide flexible access of a regulated system, in accordance with various aspects described herein.

FIG. 2 illustrates a system 30, specifically a system within the aircraft 10, for providing flexible write-access to internal data of a regulated system 60 (e.g., an avionics system). As shown, the system 30 can include a set of environments that are schematically shown interacting with each other.

The system 30 can include a programming environment 32 having a programming editor 40 interface for coding, editing, or otherwise developing a system source code 42 for the regulated system 60. Non-limiting examples of the programming environment 32 can include a first data storage (shown as the source code database 44) for storing source code elements, coding data, revision histories, or the like. The programming environment 32 can further include a second data storage for storing information related to the regulated system 60. Specifically, the second data storage can include a memory definition 46, which can include, at least, a set of information relating to the regulated system data variable definitions. This information can be referred to as the memory definition 46 information. As such, the programming environment 32 can access the set of regulated system data variable definitions located within the memory definition 46 information in order to obtain information related to the regulated system 60. It is contemplated that the programming environment 32 can access the source code database 44 to get the system source code 42 and then extract the memory definition 46 information. The programming environment 32, specifically the programming editor 40, can then be utilized via a user to decide what parameters obtained from the memory definition 46 information the user wants to be identified or otherwise communicated to the regulated system 60. In one non-limiting example, the memory definition 46 information can be developed by, or otherwise identified by a configuration tool function, hereafter, configuration tool 43. Although illustrated as the configuration tool 43 included within the programming editor 40, it is further contemplated that the configuration tool 43 can be defined as a tool exterior the programming editor 40 that runs independently of the programming editor 40 by parsing source code and generating that data store definition information.

It will be further appreciated that the programming environment 32 can be defined as a toolchain to process the system source code 42. In other words, the programming environment 32 can include various components or tools, which can be executed according to a set execution sequence to process the system source code 42. The components of the programming environment 32 can include, but is not limited to, a compiler, a debugger, a set of data libraries, an assembler, a linker, or any combination thereof. Additionally, or alternatively, the programming environment 32 can include an Integrated Development Environment (IDE), which can include or otherwise be configured to access or call upon one or more tools of the toolchain configured to write the system source code 42. It will be yet further appreciated that the programming editor 40 can be included within the toolchain of the programming environment 32 such that the toolchain can develop and process the system source code 42. In other words, the purpose of the programming editor 40 can be fulfilled through one or more components included within the toolchain of the programming environment 32 such that the programming editor 40 interface does not need to be included in order to code, edit, or otherwise develop the system source code 42.

In response to the development of the system source code 42, the programming environment 32 can be configured to generate one or more loadable configuration files, shown as a definitions file 50. Although illustrated as a single definitions file 50, it will be appreciated that there can be a set of definitions files 50. As such, the system 30 can include a set of loadable configuration files. The loadable configuration file, or the definitions file 50, can be configured to provide one or more sets of data, executable commands, or runtime instructions to the regulated system 60. For example, the definitions file 50 can include, at least, the set of triggering events that can ultimately be injected or otherwise input to at least a portion of the regulated system 60. The definitions file can further include at least a portion of the memory definition 46 information. This information can be at least partially conveyed to the regulated system 60 and act as an identification of one or more components within the regulated system 60. Specifically, the definitions file 50 can include at least a portion of the memory definition 46 information to define the set of memory within the regulated system 60.

The system 30 can also include an authorized parameter writer environment 34 that can include an authorized parameter writer 52 interface adapted or configured to receive an input (e.g., at least a portion of the definitions file 50) and generate a write request instruction from a request generator 56 for updating, writing, storing, or committing at least a portion of the definitions file 50 to storage in the regulated system 60.

The system 30 is further shown including one non-limiting example regulated system environment 36 including or defining a regulated system 60. In one non-limiting example, the regulated system 60 can be defined as an avionics system (e.g., an FMS). The regulated system 60 can include a data store queue 62, a data access component 64, a data store 65, a flexible writer 72, an authorized writer 66 including an authorized writer function 68, a parser 74, and a condition monitor 82. The data store queue 62, and the data store 65 can be configured to exchange data between at least two components of the regulated system. The data store 65 can be further configured to store data within the regulated system 60. Although illustrated as a singular data store 65 and a singular data store queue 62, it will be appreciated that the data store 65 and the data store queue 62 can each be included within a set of data stores 65 or a set of data store queues 62, respectively. It will be further appreciated that the set of data stores 65 and the data store queue 62 can be each be referred to as a memory or collectively referred to as a set of memory. The memory can further include a set of data topics which refer to one or more data stores 65 or data store queues 62 based on the topic. It is contemplated that each of the set of memory can be accessible via the data access component 64 (e.g. the data access component 64 has authorized access to the set of data stores 65 and the data store queue 62). Although illustrated as interior to the regulated system 60, it will be appreciated any one or more of the set of memory can be exterior to the regulated system 60 and be accessible through one or more portions of the regulated system 60 (e.g., the data access component 64 can send a request to an external memory to send a set of requested data to at least a portion of the regulated system).

As used herein, the authorized writer 66 or authorized writer function 68 is the representative single function, program, or entity having write-access for the data access component 64. In contrast with the authorized writer 66 or authorized writer function 68, the flexible writer 72 is configured to independently (and outside of the normal operation or instruction of the regulated system 60) generate a write-access command to update data, values, or the like, in a respective memory accessible via the data access component 64, as described herein. It will be appreciated that the flexible writer 72 and the authorized parameter writer environment 34 can be collectively referred to as a flexible writer environment. As used herein, "flexible" indicates that the respective components are user-accessible to introduce or inject specific actions (such as functional actions, including but not limited to write functions) in the system 30. In this sense, they are independent introduced actions not initiated by system 30 but may include implementation using system 30 functional elements.

The data access component 64 can be operably coupled to the definitions file 50 through the parser 74, which can be configured to receive, analyze or parse at least a portion of the definitions file 50. The parser 74 can generate a parsed definitions file by analyzing at least a portion of the definitions file 50 and identify the portions of the definitions file 50 pertinent to the data access component 64 to define a set of parsed information (e.g., the parser 74 can identify the triggering events within the definitions file 50 and convey them directly to the data access component 64 within the set of parsed information). The data access component 64 can take the parsed information received from the parser 74 and either retrieve a set of requested data related to the parsed information from the set of memory, or send at least a portion of the parsed information to other portions of the regulated system (e.g., the flexible writer 72 or the condition monitor 82).

The regulated system environment 36 can provide an output to or receive an input from one or more external components of the system 30. As used herein, the term "external components" can refer to a component of the system 30 configured to receive an output from or send an input to at least a portion of the regulated system environment 36. A request queue 84 can be further provided within the regulated system environment 36 and be configured to receive an input from the external device. The input, for example, can be a command or a request from the external device for the regulated system 60 to output one or more sets of data. Specifically, the request queue 84 can be configured to trigger a data output from the data access component 64 or set of memory of the regulated system 60. In some instances, the request queue 84 can be used to transmit particular requests to enable or disable data output from the regulated system environment 36. The request queue 84 can temporarily store the requests in either the order from which they were received or by an order of importance.

A non-limiting example of the one or more external device can include a receiving component 86. The receiving component 86 can include a data recorder (e.g., a "black box"), an onboard maintenance system, a verification environment, or any other component or system for which customized is output is desired, including components both internal and external the regulated system environment 36. It is contemplated that the receiving component 86 can be a data communication or data downlink application. It is yet further contemplated that the receiving component 86 can be other external devices such as, but not limited to, an EFB or a Software Development Kit (SDK) on the EFB.

As illustrated, the receiving component 86 can include, at least, a request generator 87 with an input 88 to the regulated system 60. The receiving component 86 can further be communicatively coupled to the regulated system by an output 89 from the regulated system 60. Specifically, the input 88, and hence the request generator 87, can be communicatively coupled to the request queue 84. The output 89 can be communicatively coupled to at least the data access component 64. As discussed herein, the data access component 64 can be configured to output data via the output 89 only when the condition monitor 82 has determined the occurrence of one or more triggering events of the set of triggering events. As such, the data access component 64 can be configured to output data via the output 89 periodically, and output data via the output 89 relating to an occurred triggering event aperiodically. As such the receiving component 86 can send requests to at least a portion of the data access component 64 for one or more sets of data (e.g., data related to the operation of the regulated system 60), via the input 88, and receive, via the output 89, one or more sets of requested data relating to the data that was requested. The output 89 can be further defined as a stream output from the regulated system environment 36 to the receiving component 86. As such, the output 89 can define a continuous stream of data being transmitted from the regulated system environment 36 to the receiving component 86. The data output from at least a portion of the data access component 64 can be defined as either periodic or aperiodic data. In other words, the data output from the data store 65 through the output 89 can be sent on a regular, predetermined interval (i.e., periodic data) or be sent upon request (e.g., aperiodic data).

The condition monitor 82 can be communicatively coupled with the data access component 64 and be configured to monitor or observe the data access component 64 for the occurrence of one or more triggering events within the regulated system 60. If the condition monitor 82 determines that a triggering event has occurred, then the condition monitor 82 can send a request through the request queue 84 to the data access component 64 to output or transmit at least a subset of data related to the occurrence of the triggering event to the receiving component 86. In such a case, the request queue 84 can prioritize requests from the condition monitor 82 such that the request queue 84 can send the request from the condition monitor 82 to the data access component 64 right after receiving the request from the condition monitor 82. Alternatively, the condition monitor 82 can send a request directly to the data access component 64 to output or retrieve data from other portions of the regulated system 60. For example, the condition monitor 82 can send a request to the data access component 64. The request can be tied to a particular group or set of data as defined by the definitions file 50. As such, the data access component 64 can then retrieve the particular group or set of data relating to the request from one or more corresponding memory. It is yet further contemplated that the subset of data related to the occurrence of the at least one triggering event can be defined as an empty subset of data. As such, the empty subset of data can be configured to indicate to the receiving component 86 that at least one triggering event has occurred without sending sets of data. It is further contemplated that the regulated system 60 can include a set condition monitors 82. As such, the condition monitor 82 can be defined as any suitable device or sets of devices configured to read or otherwise monitor one or more components within the regulated system 60 (e.g., the data access component 64) for the occurrence of one or more triggering events.

It will be further appreciated that the condition monitor 82 can monitor or observe any suitable component within the regulated system for the occurrence of triggering events. For example, the condition monitor 82 can monitor itself. Non-limiting examples of a triggering event can include the condition monitors 82 observation of a triggering event or the output, from the condition monitor 82, the request for the data access component 64 to output at least a subset of data related to a triggering event that has occurred.

The triggering events that the condition monitor 82 can observe, look or monitor for can be defined or identified by the definitions file 50. Upon startup of the regulated system, at least a portion of the definitions file 50 including the set of triggering events can be injected into the regulated system 60. The triggering events can subsequently be received by or identified to the condition monitor 82. As such, the condition monitor 82 can then observe, look, or monitor for the occurrence of the triggering events identified by the definitions file 50. Alternatively, at least one of the triggering events or memory of the set of memory can be redefined or otherwise be received by the condition monitor 82 during runtime of the regulated system 60. In other words, at least one of the triggering events or memory of the set of memory can be dynamically updated by receiving or otherwise redefining them within the regulated system 60 during runtime of the regulated system 60. Once a condition or triggering event is determined to have occurred and the condition monitor 82 can send a request to the data access component 64 to output one or more sets of data related to the triggering event which has occurred. The condition monitor 82 can then stop observing for the occurrence of the least one triggering event that has occurred. Alternatively, the condition monitor 82 can continue to monitor for a reoccurrence of the triggering event. It will be further appreciated that the request from the condition monitor 82 to the data access component 64 can result in a start or a stop in the output of a periodic set of data from the data access component 64. In other words, the occurrence of at least one triggering event can result in the data access component 64 to start outputting periodic sets of data or can result in the data access component 64 to stop outputting periodic sets of data. It is contemplated that the output of periodic sets of data can occur between the occurrence two triggering events such that the data access component 64 begins outputting periodic sets of data once the condition monitor has requested the data access component 64 start outputting data relating to the occurrence of at least one triggering events, and subsequently stop outputting the periodic sets of data once another triggering event has occurred. It will be appreciated the opposite is true such that the data access component 64 can stop outputting periodic sets of data between the occurrence of two triggering events.

As discussed herein, the receiving component 86 can send a request via the input 88 to the condition monitor 82. For example, the request from the receiving component 86 can be for the condition monitor 82 to output one or more sets of triggering events that have either occurred or that the condition monitor 82 is currently observing or otherwise monitoring for. As such, the receiving component 86 can be made aware of which triggering events the condition monitor 82 is monitoring for or has already detected. In one non-limiting example, the receiving component 86 can send a request to the condition monitor 82 to output the triggering events that it is monitoring upon startup of the regulated system 60. Additionally, or alternatively, the receiving component 86 can send, through the request queue 84, the set of triggering events to the condition monitor 82. This can occur during startup or runtime of the regulated system 60. The receiving component 86 can receive the triggering events from the programming environment 32 as illustrated. It is further contemplated that the condition monitor can output the set of triggering events requested by the receiving component either by sending the set of triggering events to the data access component 64 that can subsequently send them to the receiving component 86 through the output 89, or the condition monitor 82 can include an output directly to the receiving component 86.

The receiving component 86 can be further configured to be communicatively coupled to other portions of the system 30. Specifically, the receiving component 86 can be communicatively coupled to at least a portion of the programming environment 32 such that the receiving component 86 can receive one or more sets of decoder files from the programming environment 32. The programming environment 32 can allow the receiving component 86 to decode data obtained, acquired, or otherwise received from at least a portion of the regulated system environment 36. For example, data received by the receiving component 86 from at least a portion of the regulated system 60 can be serialized (e.g., serialized bytes). The receiving component 86 can decode the serialized data based on information contained within the programming environment 32, and specifically with one or more decoder files received from the programming editor 40.

While the system 30 illustrates the programming environment 32, the authorized parameter writer environment 34, the regulated system environment 36, and the receiving component 86 are illustrated proximate to each other, non-limiting aspects of the disclosure will be understood wherein temporal or physical spacing occurs between the respective environments 32, 34, 36 or the receiving component 86. For example, the programming environment 32 is likely utilized well before the regulated system 60 is implemented in any further environment, such as the FMS of an aircraft. Similarly, the authorized parameter writer environment 34 can include a mobile development component, such as a Portable Electronic Device (PED) (e.g., a laptop, tablet, etc.) that can be transportable relative to the otherwise fixed regulated system 60 (that can be fixed relative to a particular aircraft). Additionally, it will be understood that each respective environment 32, 34, 36 can include respective interfaces for utilizing the environment 32, 34, 36, including but not limited to user interfaces (e.g. graphical user interfaces, interactive devices such as mice), and connective interfaces (universal serial buses, Ethernet communication ports, or the like). It will be yet further understood that various portions of the system 30 can be located within other various portions of the system 30, or otherwise be its own component of the system 30. For example, although illustrated exterior the regulated system 60, the definitions file 50 can be included within the regulated system 60. As another non-limiting example, although illustrated interior the programming environment 32, the system source code 42 can be exterior the programming environment 32 such that the system source code 42 can be included within another portion of the system 30 and the programming environment 32 can extract the system source code 42 from wherever the system source code 42 is located.

It will be yet further understood that various portions of the system 30 can by bypassed or otherwise excluded from the system during certain operations or installations of the system 30. For example, if the system 30 were to be placed on an aircraft 10 during flight such that the regulated system 60 includes the FMS, the flexible writer 72 can be excluded or otherwise bypassed. As such, the authorized parameter writer 52 can input directly into the authorized writer 66 of the regulated system 60. It will be further appreciated that various portions of the system 30 shown to be discrete components from one another can be included within a single housing or in other words be a single component. For example, it is contemplated that the receiving component 86 and the and the authorized parameter writer 52 can reside in the same single housing or alternatively be the same device. As such, the request generator 56 could include an input to the request queue 84 through the input 88.

During programming activities (e.g. in the programming environment 32), the configuration tool 43 can include or be otherwise aware of prior knowledge of how data is maintained in the set of memory, the platform environment, the processor, or the like, of the regulated system 60. In some implementations, the configuration tool 43 or other system component can be configured or adapted to parse the regulated system source code 42 (or a derivative thereof) to provide a list of all available memory of the set of memory within or otherwise accessible through the data access component 64. The definition file 50 can instruct or otherwise inform one or more portions of the regulated system 60 regarding the identity of the data stores, data store queues, or a combination thereof. For instance, in one non-limiting example, the definitions file 50 can contain a defined memory layout of the embedded system, and also contain data types and variable names to make it easier to define the input parameter 54. In non-limiting examples, the definitions file 50 can be communicatively coupled to the authorized parameter writer environment 34, the authorized parameter writer 52 interface, the request generator 56, the flexible writer 72 or a subset thereof.

In some implementations, in addition to the regulated system source code 42, the configuration tool 43 can analyze or otherwise use one or more binary object files of the regulated system 60 to determine the memory layout of the regulated system 60, or one or more network configuration definitions to know the size of a byte stream, the depth of buffers, or a set of configuration identifiers. For example, a compiler can optionally create a representation specification, which can be configured to explain or otherwise define a memory layout of one or more sets of data within a corresponding memory. It is contemplated that a tool included within the programming environment 32 can combine the representation specification with an understanding of data composition and inheritance that is extracted from the system source code 42. As such, the memory layout of one or more sets of data within a corresponding memory can be inferred through the programming environment 32. The representation specification can contain tables describing the memory layout. The configuration tool 43 can use the representation specification as an input in addition to the regulated system source code 42 (which can still be used to determine dependencies of nested data structures). Based on a target processor architecture (e.g., the processor which implements the regulated system 60), the configuration tool 43 can also be aware of byte alignment and endianness to adjust offsets in the loadable configuration file illustrated as the definitions file 50.

As shown, in some non-limiting aspects, the definitions file 50 can include additional information for each identified data store, data store queue, or the like. The additional information can include, but is not limited to, size, parameters, data type, engineering units, or the like. In some implementations, the definitions file 50 can specify or define certain data groups (e.g. specific memory of the set of memory) that can be written or overwritten during runtime of the regulated system 60.

In some implementations, in addition to specifying or defining data store or data store queue definitions, the definitions file 50 can also specify or define particular data entries (e.g., parameters) within specific memory of the set of memory.

In particular, the loadable configuration file (the definitions file 50) can further provide or enable the authorized parameter writer 52 or the flexible writer 72 to encode parameter data to be written to set of memory accessible the data access component 64. For example, encoded parameter data to be written to the data store queue 62 or data store 65 can be a set of serialized data (e.g., serialized bytes). Additionally, or alternatively, the definitions file 50 can further provide operating conditions for one or more components within the regulated system 60. For example, the definition file 50 can define the one or more threshold values or conditions for the condition monitor 82 to look for or otherwise monitor. The definitions file 50 can further define set of memory within the regulated system 60 that contain sets of data relating to the triggering events.

During runtime, which can include runtime operation of the aircraft, or for example, testing or maintenance-based runtime of the regulated system 60, a user, function, system, or program can desire a change of a parameter value of one or more memory of the set of memory. Such a flexible change to parameter value or a definition of one or more sets of triggering events can be enabled by way of the system 30 described herein.

For example, a user, function, system, or program can access the authorized parameter writer environment 34 in order to generate a request to update or otherwise write or overwrite a specific parameter (or set of parameters), indicated by the definitions file 50. The request is generated by the request generator 56, as encoded or informed by the loadable configuration files, and provided to the regulated system 60 or the flexible writer 72 by way of communication 58. Further, a user, function, system or program can utilize various portions of the system 30 to input or otherwise generate a loadable configuration file which defines or contains the set of triggering events. As discussed herein, the loadable configuration file can further include instructions for the condition monitor 82. These instructions can, for example, provide guidance for the condition monitor 82 of what triggering events to monitor for and when to request the data access component 64 output data (e.g., data related to an occurred triggering event or a request from the receiving component 86) through the output 89 and to the receiving component 86. For example, the definitions file 50 can include instructions for the condition monitor 82 to send a request to the data access component 64 to output a subset of data related to one or more triggering events that the condition monitor 82 has determined to have occurred from the regulated system 60.

The flexible writer 72 can be configured or adapted to provide flexible access of the regulated system 60 and intercept or replace an authorized instruction communication 70 from the authorized writer 66 with another communication 78 (shown schematically intercepting instruction communication 70 in box 80), and replace, inject, or otherwise update the authorized instruction communication 70 to include the requested parameter update (e.g., an update to the set of triggering events defined within the definitions file 50). In one non-limiting example, the replacing, injecting, or otherwise updating the authorized instruction communication 70 can further be encoded or informed by way of the definitions file 50 or any other loadable configuration file. The updated authorization instruction communication with the requested parameter update is then delivered to the data access component 64, where the modified authorized write-access instruction is executed, or otherwise written to memory.

It is contemplated that a feedback mechanism for the writer can be included (e.g. the authorized parameter writer 52, the flexible writer 72, or a combination thereof) to know that the writing was successful. As illustrated, the flexible writer 72 can provide feedback to the authorized parameter writer 52. This can occur, for example, during runtime for deterministic (automated) runtime of the regulated system 60. In another non-limiting example, the feedback mechanism can include notification to or for the writer when a subscriber (e.g., the condition monitor 82) of at least one memory of the set of memory has actually read the data or event change requested. In yet another non-limiting example, a feedback can be provided from the data access component 64 to confirm when the write from the flexible writer 72 has occurred.

Figure 3:
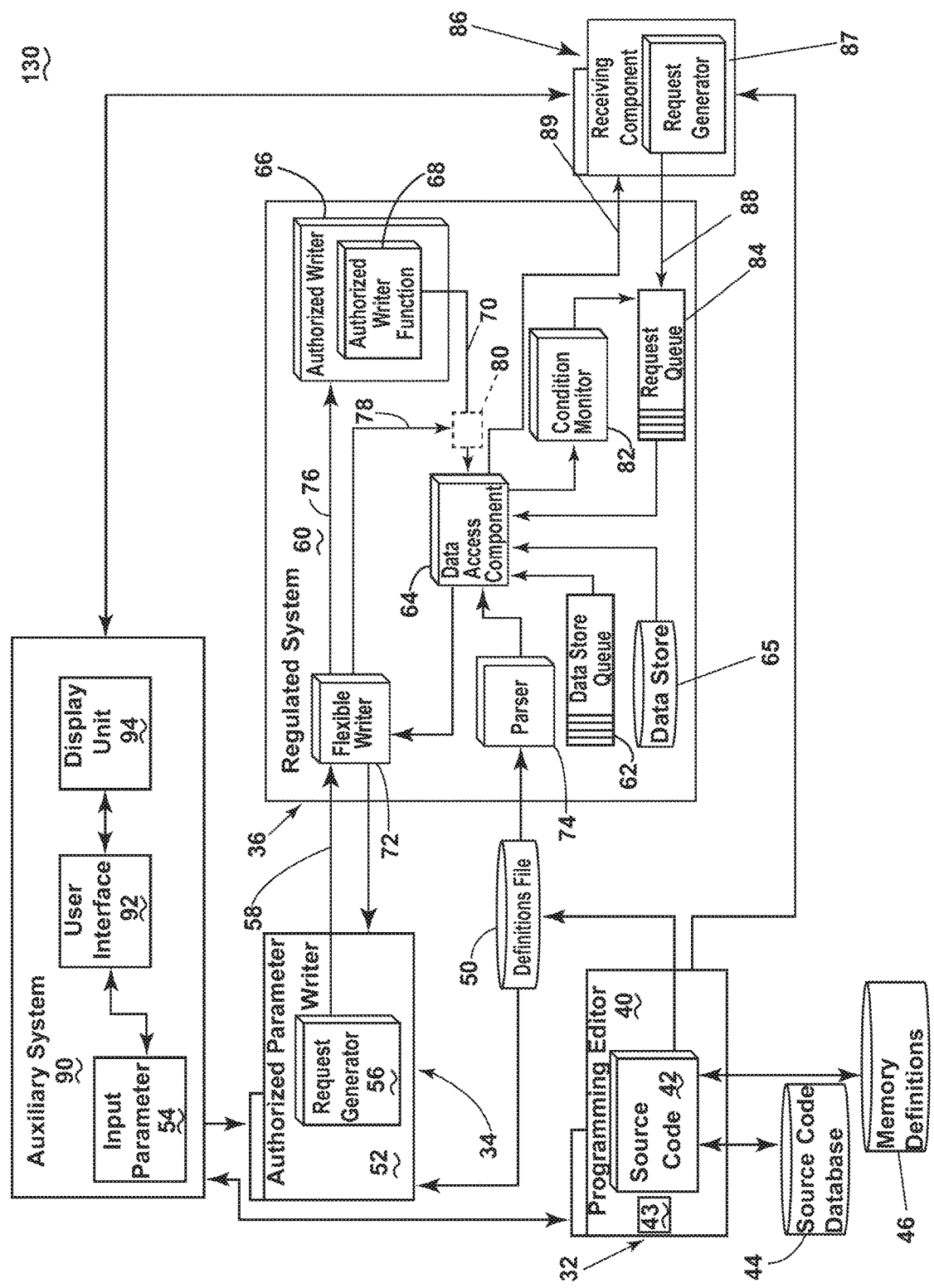
FIG. 3 illustrates an example schematic view of an exemplary system to provide flexible access of the regulated system of FIG. 2, further including an auxiliary system in accordance with various aspects described herein.

FIG. 3 illustrates an exemplary system 130 similar to the system 30 of FIG. 2, in that it includes the same components of the system 30, however, the system 130 further includes an auxiliary system 90 configured to input one or more sets of data (e.g., data relating to one or more triggering events of the set of triggering events) into the regulated system environment 36. The auxiliary system 90 can include a user interface 92 operatively coupled to the input parameter 54 and a display unit 94. As discussed herein, the auxiliary system 90 can any suitable system or component configured to provided updated or dynamic runtime instructions into the regulated system 60 either at startup or during runtime of the regulated system 60. A non-limiting example of the auxiliary system 90 includes a test system configured to input one or more sets of test data (e.g., test data relating to one or more test procedures) into the regulated system 60.

The user interface 92 is configured to receive an input from a user of the auxiliary system 90. The user interface 92 can be any one or more of a haptic feedback screen, a keyboard, a monitor, PED, or the like. An input parameter 54 can be defined through the auxiliary system 90 via the user interface 92, which can be configured such that an input from the user can be interjected into the system 30 through the input parameter 54. The input parameter 54 from the user can be, for example, a set of data, procedures, or at least a portion of the set of triggering events which the user would like the regulated system environment 36 to simulate or operate at. Specifically, in terms of the test system, the input from the user can the set of test data relating to one or more test procedures. The input from the user can further be a flight procedure that defines a sequence of events or triggering events (e.g., an approach following an arrival procedure), an altitude, a temperature, a wind speed, a threshold, or any combination thereof. It is further contemplated that the user interface 92 can include a communication pathway from one or more components of the system 130 to at least a portion of the auxiliary system 90. Specifically, the communication pathway can communicatively couple the auxiliary system 90 to authorized parameter writer environment 34. As such, the authorized parameter writer environment can receive the input parameter 54 can provide it to a portion of the regulated system (e.g., the flexible writer 72) which can interject the input parameter 54 into the instruction communication 70 as described herein.

The display unit 94 can be configured to display one or more input from the user or one or more sets of data from the receiving component 86. The display unit 94 can include one or more screens for displaying data received or otherwise input through the auxiliary system 90. It is contemplated that the display unit 94 can be included within the user interface 92 such that the display unit 94 and the user interface 92 can be collectively referred to as Multi-Function Control Display Unit (MDCU). In other words, the user interface 92 and the display unit 94 can collectively include one or more screens, buttons, or other controls for receiving and displaying user input and additionally displaying one or more sets of data from other portions of the system 130.

It is further contemplated that the auxiliary system 90 can be operatively coupled to the receiving component 86 such that a user can send requests to the receiving component or receive one or more sets of data from the receiving component 86. Non-limiting examples include the user using the user interface 92 to request the receiving component 86, specifically the request generator 87, retrieve one or more sets of data from the regulated system 60. For example, the user could request that the receiving component 86 retrieve the set of triggering events the condition monitor 82 is currently observing or otherwise monitoring for. As described herein, the condition monitor 82 can subsequently send a request to the data access component 64 to output the requested data through output 89 to the receiving component 86, which can be directed back to the auxiliary system 90 from the receiving component 86. It is yet further contemplated that the user can request an update to at least one triggering event or otherwise inject a new triggering event for the condition monitor to observe or otherwise monitor for through the receiving component 86.

As illustrated, the auxiliary system 90 can be operably coupled to at least a portion of the programming environment 32 such that the auxiliary system 90 can receive from or send to the programming environment 32 one or more sets of data or triggering events. For example, the auxiliary system 90 can be operably coupled to the programming environment 32 such that at least a portion of the system source code 42 can be transmitted directly to the auxiliary system 90 to be displayed on the display unit 94 (e.g., the set of triggering events, or the set of memory defined by the programming environment 32 can be sent to the auxiliary system 90 to be displayed on the display unit 94). In yet another example, the auxiliary system 90 can be utilized by the user to input one or more data values or triggering events directly to the programming environment 32. The programming environment 32 can subsequently utilize these triggering events received from the auxiliary system 90 to generate the definitions file 50 including the triggering events input by the user through the user interface 92. Additionally, or alternatively, the user interface 92 can be used in place of or in conjunction with the programming editor 40 interface or vice-versa to code, edit, or otherwise develop the system source code 42. As both the user interface 92 and the programming editor 40 interface can be utilized by a user to select or view the set of memory or triggering events, it will be appreciated that both the user interface 92 and the programming editor 40 interface can be defined as an interface that enables a user to select the set of memory or set of triggering events from a set of available memory of the set of memory or a set of available triggering events, respectively.

As a non-limiting example, at least a portion of the programming environment 32, specifically the configuration tool 43, can be configured to obtain a data file (e.g., from the memory definition 46 information) that describes a set of available memory of the set of memory. The programming environment 32 or the configuration tool 43 can then provide to the user a list of available memory of the set of memory through the user interface 92 or the programming editor 40 interface. Once the user selects at least one memory form the list of available memory of the set of memory, the programming environment 32 or the configuration tool 43 can generate the loadable configuration file (e.g., the definitions file 50) based at least in part on the available memory of the set of memory selected by the user. It will be appreciated the generation of the loadable configuration file can further be based in part on the structure of the data in a corresponding memory, a platform information, a processor information, or one or more requirements of the receiving component 86. It will be further appreciated that the operations of the programming environment 32 can occur when the regulated system 60 is offline. In other words, the programming environment can be configured to obtain the data file that describes the set of available memory of the set of memory during a period of time that is not during the runtime of the regulated system 60.

Figure 4:
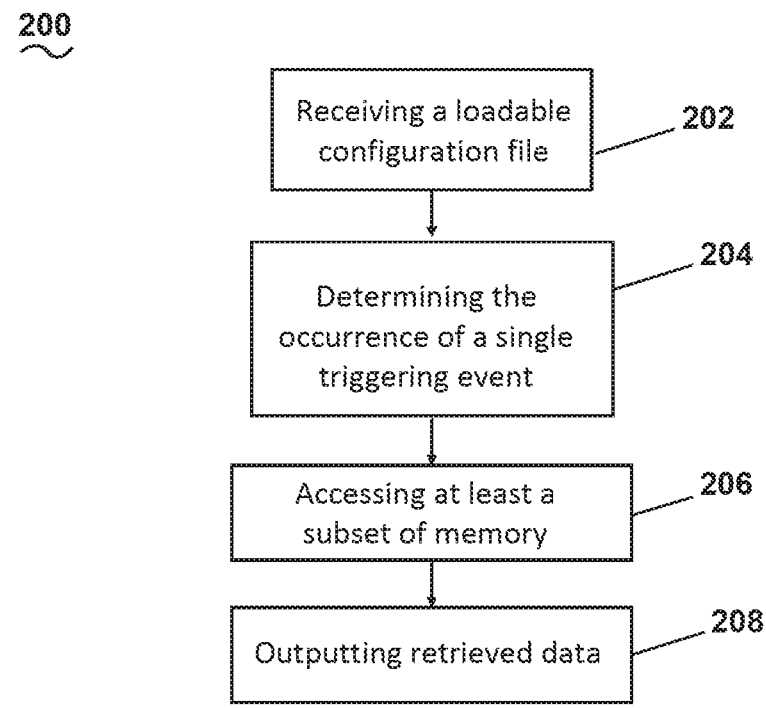
FIG. 4 illustrates a method of providing flexible access to internal data of the regulated system of FIG. 2, in accordance with various aspects described herein.

FIG. 4 illustrates a non-limiting example method 200 of providing flexible access to internal data of the regulated system 60 of FIG. 2 and FIG. 3. Specifically, the method 200 is a non-limiting example of providing flexible access of the regulated system 60 in order to define the set of triggering events. Although described in terms of the regulated system 60, it will be appreciated that the method 200 can be applied to any suitable system such as, for example, the avionics system or the FMS. It will be appreciated that the method 300 can be applied to either system 30, 130, or any other suitable system. It will be appreciated that the method 200 can be applied to either system 30, 130, or any other suitable system. For example, the method 200 can be applied to a system including the auxiliary system 90 (e.g., a test system), or be used during flight of the aircraft 10 such that the method 200 can be applied to a flight system. In other words, the regulated system 60 can be defined as an avionics system configured for in-flight use. Specifically, the method 200 can be applied to the regulated system 60 including an FMS used during flight of the aircraft 10.

The method 200 can begin with receiving, via the data access component 64, one or more of the loadable configuration files (e.g., the definitions file 50), at 202. The loadable configuration files can specify or define the set of triggering events and a set of memory. As such, the loadable configuration file can define the set of memory such that the data access component 64 can subscribe to or otherwise gain access to at least a portion of data within a corresponding memory defined by the loadable configuration file. The set of triggering events can contain the one or more threshold values for a set of parameters (e.g., sets of avionic parameters) which will cause a response or output from the regulated system environment 36 if one or more threshold values are reached. For example, the set of triggering events can contain or otherwise define a threshold altitude. Specifically, the threshold altitude can be, for example, the cruise altitude of the aircraft 10. This is meant to be a non-limiting example, as the set of triggering events can include any suitable set of threshold values in regards to any suitable parameter including, but not limited, altitude, temperature, airspeed, pressure, weather patterns, local traffic, or any combination thereof. The set of memory of the regulated system 60 which can contain one or more sets of data such as, but not limited to, the data store 65, or the data store queue 62. Additionally, or alternatively, the set of memory can be any store of data or value of data, stored in memory, used or utilized for processing operations of the regulated system 60 or another system. As described herein, the set of memory can include, but are not limited to, a set of parameters or data associated with the set of triggering events.

Once the set of triggering events and set of memory are read, it can be determined, via at least a portion of the regulated system environment 36 (e.g., the data access component 64), that one or more triggering events of the set of triggering events or threshold values have been reached, at 204. For example, the set of triggering events can include a threshold airspeed. Once a portion of the regulated system environment 36 (e.g., the condition monitor 82) reads an instantaneous airspeed of greater than or equal to the threshold airspeed, it can be determined that at least one triggering event has occurred. This approach of determining the occurrence of at least one triggering event can allow for the data access component 64 to be directed toward the data store 65, or any other suitable memory, such that the data access component can then periodically draw data from the data store 65, or any other suitable memory. In response to the occurrence of at least a single triggering event, a subset of the memory of the set of memory accessible via the data access component 64 can be accessed, via the data access component 64, at 206. The data retrieved from the subset memory of the set of memory accessible via the data access component 64, can be defined as a set of retrieved data. The set of retrieved data can be related to one or more sets of data associated with at least a single triggering event specified by the loadable configuration files. For example, in an instance where the occurrence of the triggering event at 204 was a threshold temperature that has been determined to be reached through the regulated system 60, the retrieved data can be one more conditions of the aircraft 10 which would occur in response to or otherwise at the threshold temperature. The retrieved data can be, but is not limited to, a temperature, a pressure, a process, an altitude, an airspeed, or the any combination thereof. The retrieved data can then be output to the receiving component 86 through the data access component 64 and the output 89, at 208. It is contemplated that outputting the retrieved data can include generating a bitstream of the retrieved data such that the retrieved data is sent to the receiving component 86 in a continuous, real-time fashion. Additionally, or alternatively, the outputting of the retrieved data can be in the form of large clumps of retrieved data are transmitted to the receiving component 86 during periodic intervals, aperiodic intervals, or any combination thereof. For example, a portion of the regulated system 60 (e.g., the data access component 64) can interleave aperiodic data with periodic data. In other words, the outputting of the retrieved data can be sent to the receiving component 86 as a continuous bit stream with both periodic and aperiodic data interleaved. In some cases, it is contemplated that a set of periodic data and a set of aperiodic data can be output at the same time. In other instances, periodic data can be continuously output from the data access component 64 to the receiving component 86. Other sets of data can be interleaved with the data that is continuously output such that it does not disturb or otherwise interrupt the continuous output of the periodic data. In any case, the retrieved data can include a header with a time stamp of when the data was taken or generated.

Figure 5:
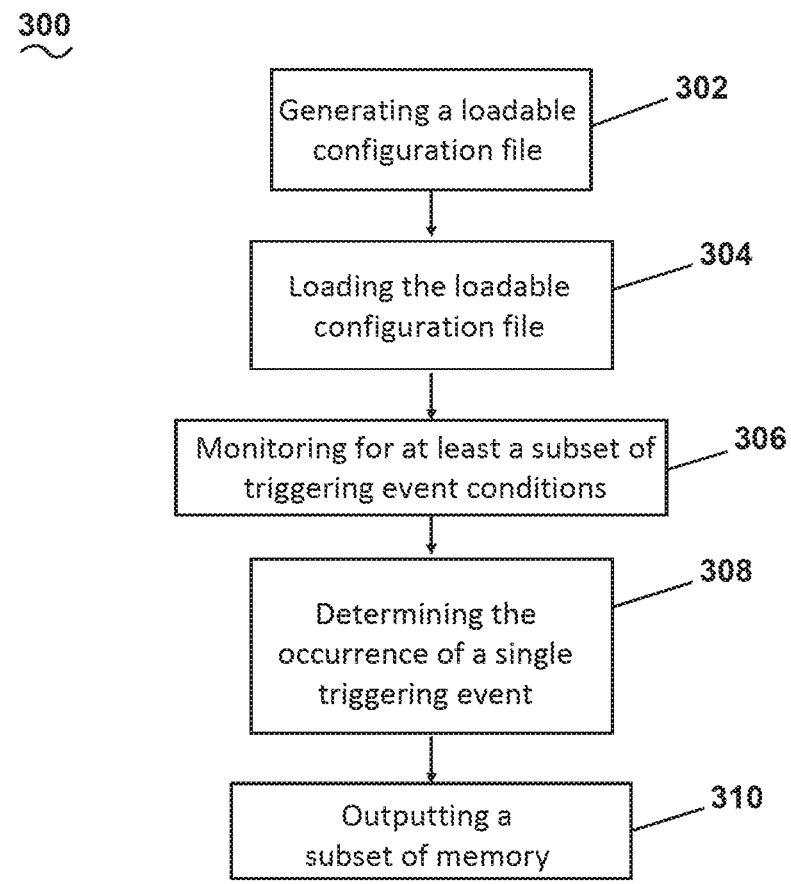
FIG. 5 illustrates an exemplary method of providing flexible access to internal data of the regulated system of FIG. 2, in accordance with various aspects described herein.

FIG. 5 illustrates a non-limiting example method 300 of providing flexible access to internal data of the regulated system 60 of FIG. 2 and FIG. 3. Specifically, the method 300 is a non-limiting example of providing flexible access of the regulated system 60 in order to define the set of triggering events. Although described in terms of the regulated system 60, it will be appreciated that the method 300 can be applied to any suitable system such as, for example, the avionics system. It will be appreciated that the method 300 can be applied to either system 30, 130, or any other suitable system. For example, the method 300 can be applied to a system including the auxiliary system 90 (e.g., a test system), or be used during flight of the aircraft 10 such that the method 200 can be applied to a flight system.

The method 300 can begin by generating, via a portion of the programming environment 32 (e.g., the configuration tool 43), the loadable configurations files (e.g., the definitions file 50), at 302. The loadable configuration files can specify or define the set of triggering events and the set of memory. Each triggering event of the set of triggering events can be associated with a subset of the set of memory. The loadable configuration files can then be loaded at or otherwise provided to the regulated system 60, at 304. The set of memory can then be monitored during runtime of the regulated system 60, at 306. Specifically, the condition monitor 82 can observe or otherwise monitor for the occurrence of the triggering events. It can then be determined by the condition monitor 82 that at least one of the triggering events has occurred or is meet during runtime of the regulated system 60, at 308. In the case where at least a singular triggering event of the set of triggering events has been determined to have occurred or otherwise detected, the subset of memory associated with the at least one triggering event which has occurred can be output, via the data access component 64 or the condition monitor 82, at 310.

The sequences depicted is for illustrative purposes only and is not meant to limit the methods 200, 300 in any way as it is understood that the portions of the method can proceed in a different logical order, additional or intervening portions can be included, or described portions of the method can be divided into multiple portions, or described portions of the method can be omitted without detracting from the described method. For example, the methods 200, 300 can include various other intervening steps. The examples provided herein are meant to be non-limiting.

In one non-limiting example, the methods 200, 300 can include providing the user interface 92 or an Application Programming Interface (API) (e.g., the programming editor 40 interface) the set of memory such that a user can select from the set of available memory of the set of memory. It is contemplated that the user interface 92 or the API can receive at least a portion of the set of memory by at least a portion of the configuration tool 43. The user can subsequently select the desired memory of the set of available locations. This selection can be received, via the configuration tool 43. In the instance where the user selects the memory through the user interface 92, the selected memory of the set of memory can either be input directly into the regulated system 60 through the authorized writer parameter, or the auxiliary system 90 can output directly to the programming environment 32. The loadable configuration files based at least in part on the received selected set of memory can then be generated, via the configuration tool 43 or via another portion of the programming environment 32. It is contemplated that the loadable configuration files can specify or define the set of memory (e.g., the set of data stores 65, or the set of data store queues 62) which were selected by the user along with a size or a type or information (e.g., floating- or fixed-point numbers, signed or unsigned integers, enumerated types with inter string mappings, or the like) associated with each of the selected memory of the set of memory. The loadable configuration files can then be provided to at least a portion of the regulated system 60, specifically the data access component 64. It is further contemplated that the configuration files, based at least in part on the user input received via the user interface, can then be generated, via the configuration tool 43. The set of decoder files, similar to the loadable configuration files, can then be received via the receiving component 86. The decoder files can then subsequently be utilized, via the receiving component 86, to convert or otherwise decode the retrieved data from the regulated system 60 into a human-readable format or machine-readable format to define a set of readable retrieved data. The format of the readable retrieved data can be defined by the user or through a predefined preference in the definitions file 50. The set of readable retrieved data can subsequently be sent to the auxiliary system 90 to be displayed to the user in a human-readable format (e.g., the set of readable retrieved data can be displayed on the display unit 94). As discussed herein, the auxiliary system 90 can include an input directly in to the regulated system 60 through the receiving component 86. Specifically, the auxiliary system 90 can submit a request or input data by sending it to the receiving component 86 which can in turn use the request generator 87 to generate and send the request to the request queue 84 through input 88. The data from the auxiliary system 90 can then be input into the data access component 64. For example, the user can submit a request, through the user interface 92. The request can then be transmitted to the receiving component 86 and subsequently to the request queue 84. Ultimately, at least a portion of the regulated system 60 can then output one or more sets of data related to the request.

In another non-limiting example, the methods 200, 300 can include monitoring the regulated system 60, via at least a portion of the system 30 (e.g., the condition monitor 82), for the occurrence of at least a subset of the triggering events during runtime of the regulated system 60. It is contemplated that the monitoring can be done within the regulated system environment 36 such as, for example, through the condition monitor 82. Additionally, or alternatively, the monitoring can be done through other portions of the system 30 external to the regulated system 60 or through other avionics devices. For example, the EFB can monitor for the occurrence of at least a subset of the triggering events. The monitoring can be for a subset of the triggering events or for any triggering event of the set of triggering events. In other words, the monitoring can be for the occurrence of one or more specific triggering events or it can be for the occurrence of any triggering event. This can be specified through any portion of the system, other avionic devices, or through the user input at the user interface 92. It is further contemplated that the monitoring of at least the subset of triggering events can take place during an execution frame during the runtime of the regulated system 60. As used herein, the term "execution frame" can refer to a periodic or aperiodic time frame in which the monitoring occurs. The execution frame can be manually input by the user and interjected at any time such that the execution frame aperiodically monitors the regulated system 60 for at least a subset of the triggering events. Additionally, or alternatively, the execution frame can be periodic such that the condition monitor 82 can observe for or otherwise monitor for the occurrence at triggering events at regular intervals. The periodic execution frame can be predefined through at least a portion of the system 30 or alternatively be input by the user through the user interface 92 or the API.

In yet another non-limiting example, it is contemplated that the set of triggering events can define a logic tree of triggering events. In other words, the definitions file 50 including the set of triggering events can define a sequence of triggering events. For example, the logic tree defining the set of triggering events can utilize Boolean logic to define a set of instructions that would occur dependent on which of the triggering events of the set of triggering events do or do not occur. It is further contemplated that one or more of the triggering events can include at least a modification to one or more data values of a corresponding memory. As such, at least one of the triggering events can be that the memory has been changed. For example, if the user were to manually change at least one memory or at least a portion of the memory through the user interface 92 as described herein, then a triggering event could occur. Additionally, or alternatively, the set of triggering events can include at least one comparison of at least one memory value from the at least one memory of the set of memory to a threshold memory value or threshold value as described herein. It is further contemplated that the set of triggering events can include at least a periodic event. For example, the regulated system 60 can in some instances send out a periodic set of data to the receiving component 86 summarizing the current runtime conditions of the regulated system 60. One of the triggering events can include the transmission of this periodic set of data. When this occurs, the regulated system 60 can, for example, perform other functions to supply at least a portion of data to be included within the summary such as, but not limited to, checking and reading various parameters. It is further contemplated that at least one triggering event of the set of triggering events can be a value stored within the data store queue 62. For example, if the data access component 64 receives an input or value from the data store queue 62, a triggering event can occur. In the case where the triggering event occurs when the value stored within the data store queue 62 is sent to the data access component 64, the condition monitor 82 can then start monitoring for the next available data value in the data store queue 62 to be sent to the data access component 64. It is yet further contemplated that the triggering events can other functions such as, but not limited to, unit conversions. Additionally, it is contemplated that the regulated system 60 can include other functions or predefined functions that the programming environment 32 could be aware of. As such, the programming environment 32 could create or generate the definitions file 50 knowing that the predefined functions in the regulated system 60 can be used to define the triggering events once they are input to the regulated system.

Figure 6:
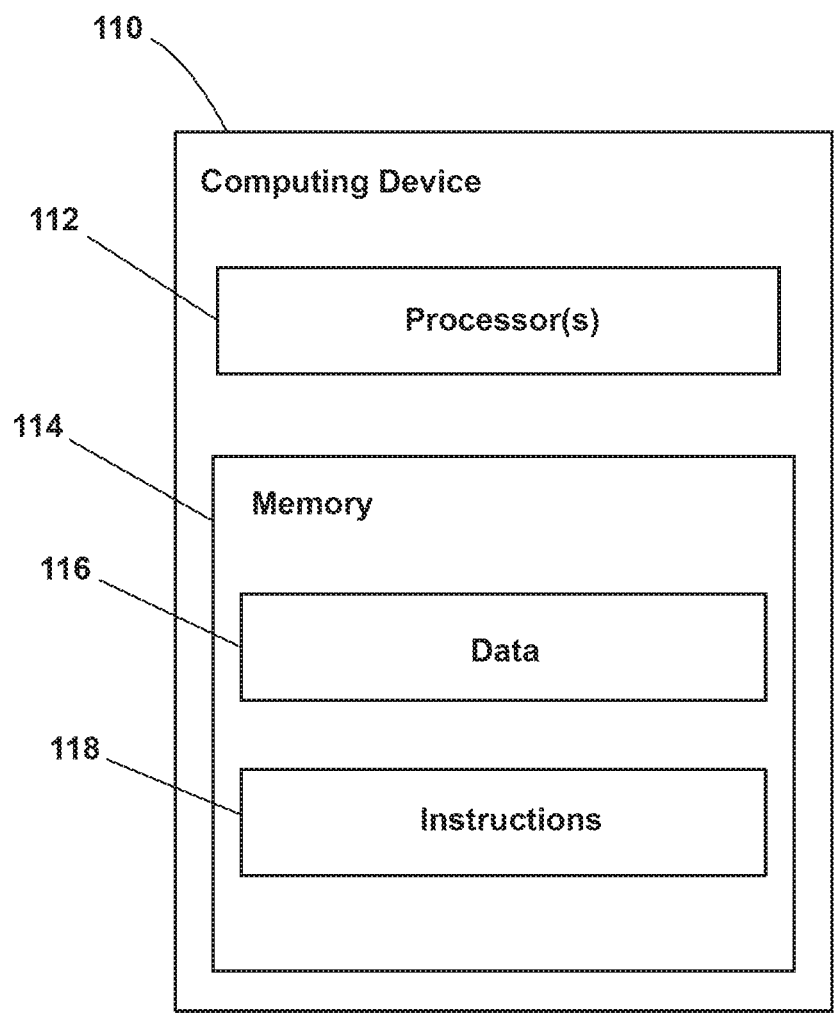
FIG. 6 illustrates an example schematic view of a computing device, in accordance with various aspects described herein.

FIG. 6 schematically illustrates one or more computing devices of the system 30, 130. Each of the configuration tool 43, the programming environment 32, the authorized parameter writer environment 34, the flexible writer 72, the receiving component 86, the auxiliary system 90, or the regulated system 60, or components thereof, can be implemented by one or more computing devices. As shown, the computing device 110 can be referred to as a controller module or a microcontroller. The computing device 110 can be stand-alone or can be embedded into a computing system or environment 32, 34, 36. In another non-limiting example, the respective components, such as the authorized parameter writer environment 34, can be located on or as a subcomponent of another vehicle or aircraft, or as an external tool.

The computing device 110 can include one or more processors 112 and a memory 114. The one or more processors 112 can be any suitable processing device, including, but not limited to, a processor core, a microprocessor, an Application Specific Integrated Circuit (ASIC), a Field Programmable Gate Array (FPGA), a controller, a microcontroller, a controller module, or the like. In another non-limiting example, the one or more processors 112 can include of processors or processor execution cores that are operatively connected. The memory 114 can include one or more non-transitory computer-readable storage mediums, such as RAM, ROM, EEPROM, EPROM, flash memory devices, magnetic disks, the like, or a combination thereof. The memory 114 can store data 116, such as data stores 65 of the data access component 64 or data store queues 62. The memory 114 can also store instructions 118 which are executed by the processor 112 to perform operations or functions described by the present disclosure.

It is readily apparent that an advantage of the present disclosure is that it enables configurable and dynamic definition of a set of triggering events without the need to recompile and recertify the regulated system (e.g., FMS).

Another advantage of the methods in comparison with conventional methods of updating internal data of the regulated system is that the method described herein allows for real-time updates to one or more sets of internal data of the regulated system. For example, conventional methods of gaining access to internal data of the regulated systems can require that the regulated system ceases running before a new set of triggering events or memory of the set of memory is input. The method described herein, however, allows for the flexible access to the internal data of the regulated system. Specifically, the methods described herein allow for a user or a configuration tool to dynamically input at least a set of triggering events or memory of the set of memory during the runtime of the regulated system. This does not require the regulated system to cease runtime. Through use of the methods described herein, the regulated system or other portions of the system do not need to be recertified or recompiled in order for the triggering events or memory of the set of memory to be included within the loadable configuration files.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

For example, when a data store queue 62 or data store accessible to the data access component 64 is written to, in accordance with the disclosure, there can also include a feedback mechanism for the writer (e.g. the authorized parameter writer 52, the flexible writer 72, or a combination there of) to know that the writing was successful. This can occur, for example, during runtime for deterministic (automated) testing. In another non-limiting example, the feedback mechanism can include notification to or for the writer when the subscriber of the data store queue 62 has actually read the data or event change requested. In yet another non-limiting example, a bi-directional data store queue 62 can support external access (e.g. external to the regulated system 60, for instance) to read the data or event change requested to confirm the write has occurred.

To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure herein, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A method to provide flexible access to internal data of a regulated system, the method comprising receiving, by a data access component of the regulated system, a loadable configuration file that defines a set of triggering events and a set of memory, wherein each triggering event of the set of triggering events is associated with a respective subset of memory, in response to determining the occurrence of a triggering event of the set of the triggering events, accessing, by the data access component, the subset of memory that contain the internal data of the regulated system to retrieve data associated with the set of memory associated with the triggering event defined by the loadable configuration file, and outputting, by the data access component, the retrieved data to a receiving component.

The method of any preceding clause, further comprising providing, by a configuration tool, an interface that enables a user to select the set of memory from a set of available memory, receiving, by the configuration tool via the interface, the selected set of memory from the set of available memory, generating, by the configuration tool, the loadable configuration file based at least in part on the received selected set of memory, wherein the loadable configuration file specifies the set of memory and an offset and a size associated with each of the selected set of memory, and providing the loadable configuration file to the data access component.

The method of any preceding clause, further comprising generating, by the configuration tool, a configuration file based at least in part on receiving a user input selecting the set of memory from the set of available memory, and providing loadable the configuration file to the receiving component.

The method of any preceding clause, further comprising decoding, by the receiving component, the data output by the data access component based on the loadable configuration file, the receiving component.

The method of any preceding clause, further comprising monitoring the regulated system for the occurrence of at least a subset of the triggering event during runtime.

The method of any preceding clause, further comprising monitoring the regulated system for the occurrence of any of the set of triggering events during runtime.

The method of any preceding clause, further comprising monitoring the regulated system for the occurrence of at least a subset of the triggering event during each execution frame during runtime.

The method of any preceding clause wherein the regulated system is an avionics system.

The method of any preceding clause wherein the avionics system is configured for in-flight use.

The method of any preceding clause wherein the avionics system includes a Flight Management System.

The method of any preceding clause wherein the regulated system is a regulated ARINC system.

The method of any preceding clause wherein the regulated system m is regulated by at least one of the ARINC 664 standard, ARINC 429 standard, ARINC 825 standard, or the RS-422 standard.

The method of any preceding clause wherein the set of triggering events includes at least a modification to one or more data values of a corresponding memory of the set of memory.

The method of any preceding clause wherein the set of triggering events includes at least one comparison of at least one memory value to a threshold memory value.

The method of any preceding clause wherein the outputting of the retrieved data can include a periodic output of retrieved data related to the triggering event.

The method of any preceding clause wherein outputting the retrieved data further comprises generating a bitstream of the retrieved data, and providing the bitstream to the receiving component.

A method to provide flexible access to internal data of a regulated system, the method comprising generating, by a configuration tool, a loadable configuration file defining a set of triggering events and a set of memory, wherein each triggering events of the set of triggering events is associated with a respective subset of memory, loading the loadable configuration file at the regulated system, monitoring the regulated system for at least a subset of the triggering events during runtime, and in response to determining at least one triggering event is met during runtime, outputting, by a data access component, the subset of memory associated with the at least one triggering event.

The method of any preceding clause, further comprising monitoring the regulated system for the entire set of triggering events during runtime.

The method of any preceding clause wherein monitoring the regulated system during runtime further includes monitoring the regulated system for at least a subset of the triggering events during each execution frame during runtime.

The method of any preceding clause wherein the regulated system is an avionics system.

The method of any preceding clause wherein the avionics system is configured for in-flight use.

The method of any preceding clause wherein the avionics system includes a Flight Management System.

The method of any preceding clause wherein the regulated system is a regulated ARINC system.

The method of any preceding clause wherein the regulated system m is regulated by at least one of the ARINC 664 standard, ARINC 429 standard, ARINC 825 standard, or the RS-422 standard.

The method of any preceding clause wherein the set of triggering events includes at least a modification to one or more data values of a corresponding memory of the set of memory.

The method of any preceding clause wherein the outputting of the retrieved data can include a periodic output of retrieved data related to the triggering event.

A system, comprising a set of memory, a data access component having a loadable configuration file defining a set of triggering events and the set of memory, wherein each triggering event of the set of triggering event is associated with a respective subset of the memory, wherein the data access component subscribes to data in the respective subset of memory based on the loadable configuration file and configured to, in response to the occurrence of at least one triggering event of the set of triggering events, outputs the data based on the subset of memory associated with the respective triggering event, and a receiving component communicatively coupled with the data access component and configured to receive the out of data by the data access component and decode the output of data from the data access component based at least in part on the configuration file.

The system of any preceding clause, further comprising a configuration tool configured to generate the loadable configuration file based on user selections and at least one of a structure of data in one or more memory, platform information, processor information, and one or more receiving component requirements.

The system of any preceding clause wherein the configuration tool obtains a data file that describes a set of available memory of the set of memory, provides an interface that enables a user to select one or more of the available memory of the set of memory, and generates the loadable configuration file based at least in part on the memory of the set of memory selected by the user.

The system of any preceding clause wherein the system is an avionics system.

The system of any preceding clause wherein the avionics system is configured for in-flight use.

The system of any preceding clause wherein the avionics system includes a Flight Management System.

The system of any preceding clause wherein the regulated system is a regulated ARINC system.

The system of any preceding clause wherein the regulated system m is regulated by at least one of the ARINC 664 standard, ARINC 429 standard, ARINC 825 standard, or the RS-422 standard.

What is claimed is:

1. A method to provide flexible access to internal data of a regulated system, the method comprising:
   providing, by a configuration tool, an interface that enables a user to select a set of memory of the regulated system from a set of available memory;
   receiving, by the configuration tool via the interface, the selected set of memory from the set of available memory;
   generating, by the configuration tool, a loadable configuration file based at least in part on the received selected set of memory, wherein the loadable configuration file specifies the set of memory and an offset and a size associated with each of the selected set of memory, the loadable configuration file further defining a set of triggering events, wherein each triggering event of the set of triggering events is associated with a respective subset of memory of the regulated system;
   receiving, by a data access component of the regulated system, the loadable configuration file;
   determining an occurrence of at least one triggering event of the set of triggering events,
   in response to determining the occurrence of a triggering event of the set of the triggering events, accessing, by the data access component, the respective subset of memory that contain the internal data of the regulated system to retrieve data associated with the set of memory associated with the triggering event defined by the loadable configuration file, and
   outputting, by the data access component, the retrieved data to a receiving component.

2. The method of claim 1, further comprising:
   generating, by the configuration tool, a configuration file based at least in part on receiving a user input selecting the set of memory from the set of available memory; and
   providing the loadable configuration file to the receiving component.

3. The method of claim 2, further comprising:
   decoding, by the receiving component, the data output by the data access component based on the loadable configuration file, the receiving component.

4. The method of claim 1, further comprising monitoring the regulated system for the occurrence of at least a subset of the triggering event during runtime.

5. The method of claim 4, further comprising monitoring the regulated system for the occurrence of any of the set of triggering events during runtime.

6. The method of claim 1, wherein the regulated system is an avionics system.

7. The method of claim 1, wherein the set of triggering events includes at least a modification to one or more data values of a corresponding memory of the set of memory.

8. The method of claim 1, wherein the set of triggering events includes at least one comparison of at least one memory value to a threshold memory value.

9. The method of claim 1, wherein the outputting of the retrieved data can include a periodic output of retrieved data related to the triggering event.

10. The method of claim 1, wherein outputting the retrieved data further comprises generating a bitstream of the retrieved data, and providing the bitstream to the receiving component.

11. The method of claim 1, further comprising providing the interface within an auxiliary system communicatively coupled to the configuration tool.

12. A method to provide flexible access to internal data of a regulated system, the method comprising:
    generating, by a configuration tool, a loadable configuration file based at least partially on an external input to the configuration tool and defining a set of triggering events and a set of memory, wherein each triggering events of the set of triggering events is associated with a respective subset of memory;
    loading the loadable configuration file at the regulated system;
    monitoring the regulated system for at least a subset of triggering events of the set of triggering events during runtime;
    determining an occurrence of at least one triggering event of the set of triggering events; and
    in response to the determining of the occurrence of at least one triggering event during runtime, outputting, by a data access component, the respective subset of memory associated with the at least one triggering event.

13. The method of claim 12, further comprising monitoring the regulated system for an entirety of the set of triggering events during runtime.

14. The method of claim 12 wherein monitoring the regulated system during runtime further includes monitoring the regulated system for at least a subset of the triggering events during each execution frame during runtime.

15. The method of claim 12 wherein the set of triggering events includes at least a modification to one or more data values of a corresponding memory of the set of memory.

16. The method of claim 12 wherein the outputting of the respective subset of memory includes a periodic output of the respective subset of memory related to the triggering event.

17. A system, comprising:
    a set of memory;
    a data access component having a loadable configuration file defining a set of triggering events and the set of memory, wherein each triggering event of the set of triggering event is associated with a respective subset of the memory, wherein the data access component subscribes to data in the respective subset of memory based on the loadable configuration file and configured to, in response to an occurrence of at least one triggering event of the set of triggering events, outputs the data based on the respective subset of memory associated with the respective triggering event;

a receiving component communicatively coupled with the data access component and configured to receive the output of data by the data access component and decode the output of data from the data access component based at least in part on the loadable configuration file; and a configuration tool configured to generate the loadable configuration file based on user selections and at least one of a structure of data in one or more memory, platform information, processor information, and one or more receiving component requirements.

18. The system of claim 17, wherein the configuration tool:

obtains a data file that describes a set of available memory of the set of memory;

provides an interface that enables a user to select one or more memory of the set of available memory; and generates the loadable configuration file based at least in part on the memory of the set of memory selected by the user.

19. The system of claim 17, wherein the system is an avionics system.

20. The system of claim 17, wherein the user selections are received within an auxiliary system communicatively coupled to the configuration tool.

* * * * *